Nov. 24, 1936.  B. B. WEATHERBY  2,062,151
METHOD OF MAKING SUB-SURFACE DETERMINATIONS
Filed Nov. 16, 1934   2 Sheets-Sheet 2
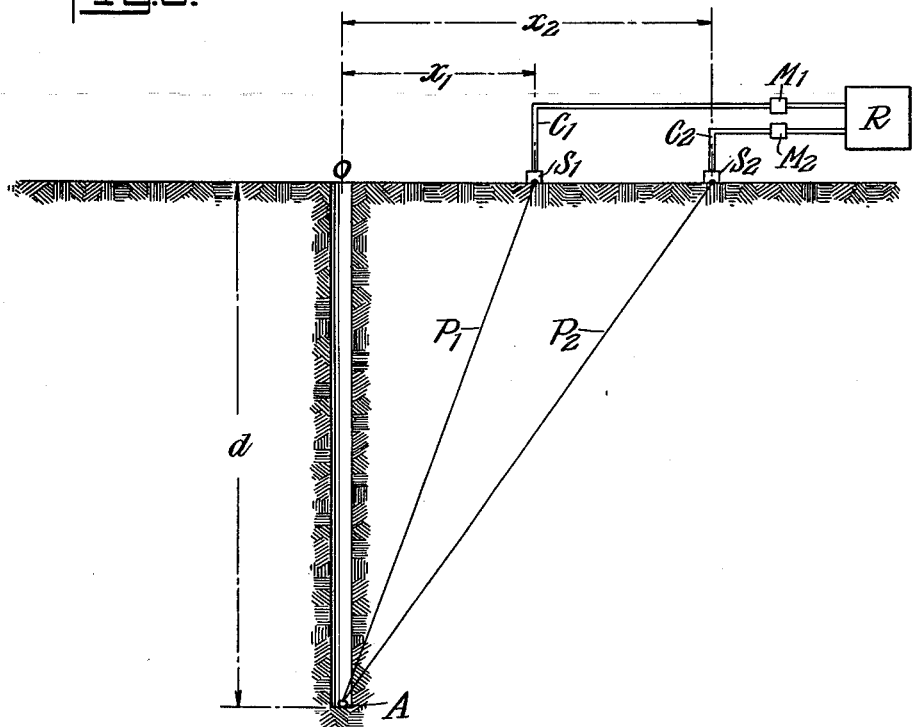
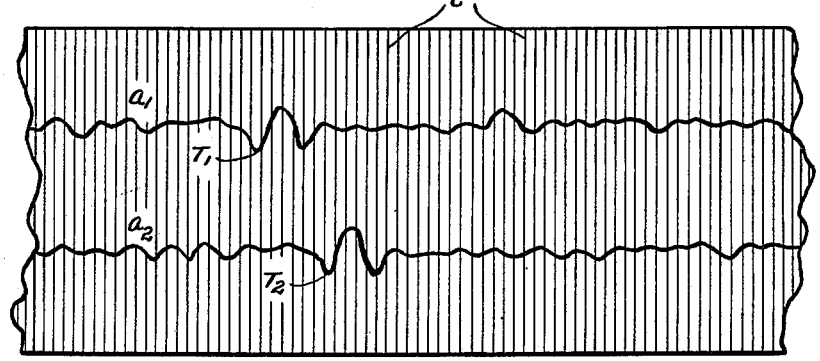
INVENTOR
Benjamin B. Weatherby
BY Kenyon & Kenyon
ATTORNEYS.

Patented Nov. 24, 1936

2,062,151

UNITED STATES PATENT OFFICE 2,062,151

METHOD OF MAKING SUB-SURFACE DETERMINATIONS

Benjamin B. Weatherby, Tulsa, Okla., assignor to Geophysical Research Corporation, New York, N. Y., a corporation of New Jersey Application November 16, 1934, Serial No. 753,293

9 Claims. (Cl. 181—0.5)

This invention relates to improvements in methods of making sub-surface determinations.

When drilling deep holes into the earth in search of oil and gas, it is not an uncommon experience to find that such holes instead of going straight down are often crooked and deviate to a considerable extent from vertical. In such cases, it is often important to determine the exact position of the bottom of the hole with reference to the position of the mouth of the hole at the earth's surface. Methods heretofore used have been of such nature as to require suspension of drilling operations in the well while obtaining data for use in determining the position of the bottom of the hole relative to the mouth of the hole.

Also, the method of seismic surveying commonly known as the reflection method requires determination of the velocity of elastic waves in the area under survey for calculation of the depth of a reflecting sub-surface horizon. It has been common practice to determine the velocity of such waves by lowering a seismic detector within a well to a known-depth and measuring the travel time of an elastic wave generated at the surface by detonation of an explosive or other suitable means. This method has the great practical disadvantage of requiring that operations in the well be suspended while the data is taken and involves the possibility of damage being done to the well by the insertion and removal of the detector.

This invention has for an object an improved method of obtaining seismic data wherein the elastic waves produced at the bottom of the well by the impact of the drill are utilized in obtaining the desired data. For determining the deviation of a well hole, a plurality of seismic detectors are placed at the surface of the earth at varying distance from the mouth of the well and simultaneous records are made of elastic waves reaching the several detectors from the bottom of the well. The intervals between the arrival of the waves at the detector nearest the hole mouth and each of the other detectors are measured and used to determine by an algebraic process the location of the bottom of the hole relative to the top of the hole.

In practicing this invention for determination of the velocity of the elastic waves, two or more detectors are placed on the surface at varying distances from the mouth of the well and simultaneous records are made of the waves reaching the detector from the bottom of the well. Since the detectors are placed at different distances from the mouth of the well, the travel time of elastic waves originating at the bottom of the hole to each of the detectors will be different and by measuring the difference between these travel times, the velocity may be calculated. If the depth of the hole is known, only two detectors are required, but if the depth of the hole is not known, at least three detectors must be used to obtain sufficient data to calculate both the hole depth and the velocity.

Referring now to the drawings:

Fig. 1 indicates a section through a hole with a plurality of wave detectors arranged for obtaining data to determine the deviation of the bore hole;

Fig. 3 illustrates a section through a drill hole with wave detectors arranged to determine the wave velocity, and Fig. 4 illustrates a composite record of the waves received by the detectors.

As is well-known, a well is commonly drilled by means of a heavy steel bit which is alternately raised from and dropped to the bottom of the bore by means of a cable extending to the surface. At each impact, the bit crushes the material upon which it falls, thus gradually increasing the depth of the bore. The impact of the bit upon the bottom of the hole produces elastic waves which radiate in all directions and such elastic waves are utilized in the practice of the present invention.

Figure 1:
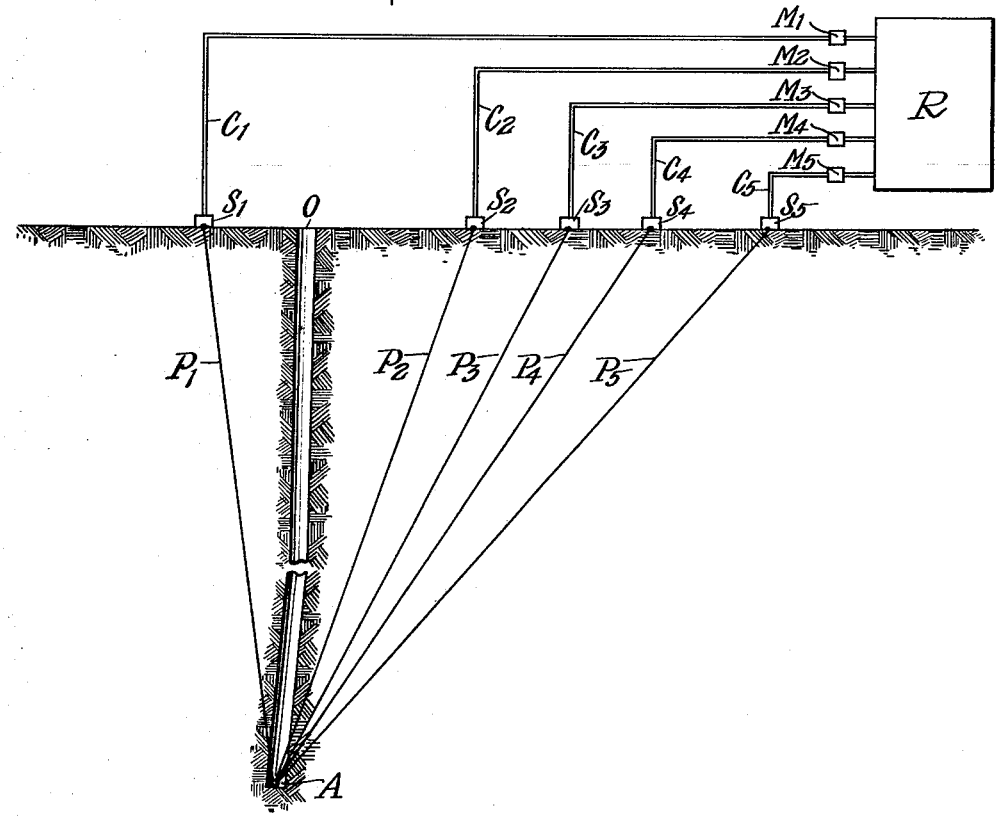

In Fig. 1, O designates the top of a drill hole and A designates the bottom thereof. The drilling tool (not shown) is working at the point A and that point, therefore, represents the point, the position of which is to be determined. A plurality of wave detectors $S_1$, $S_2$, $S_3$, $S_4$, and $S_5$ are placed on the earth's surface at different distances from the point O in an unsymmetrical arrangement. In Fig. 1, they are shown in line with each other, but they need not be so arranged, the showing in Fig. 1 being made only for convenience of illustration. The wave detectors are connected by two-wire cables $C_1$, $C_2$, $C_3$, $C_4$ and $C_5$ to a recorder R which produces on a single strip of paper traces of the waves received at the different detectors and provides timing lines on the paper strip, such a recorder being well-known in the art. $P_1$, $P_2$, $P_3$, $P_4$ and $P_5$ represent wave paths between the point A and the various wave detectors.

Figure 2:
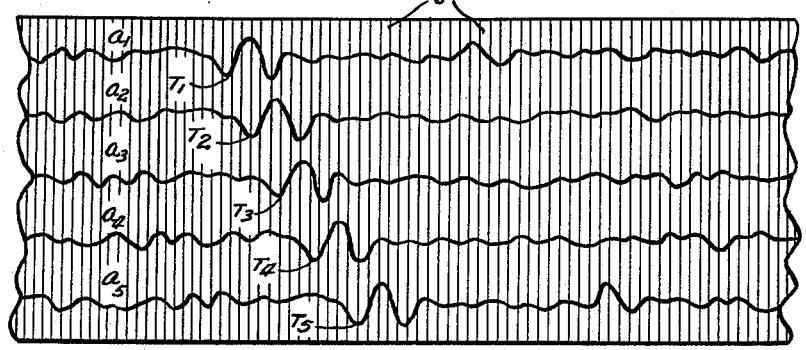
Fig. 2 illustrates a composite record of the waves received by the wave detectors.

In Fig. 2, $a_1$, $a_2$, $a_3$, $a_4$ and $a_5$ represent traces produced by the recorder of waves reaching the detectors $S_1$, $S_2$, $S_3$, $S_4$ and $S_5$ respectively from the point A, such waves being produced by the drilling tool at this point. The lines $l$ are the timing lines above referred to and the points $T_1$, $T_2$, $T_3$, $T_4$, and $T_5$ represent respectively the times of arrival at the detectors, of corresponding portions of a wave originating at the point A. By means of the timing lines $l$, the time intervals $(T_5-T_1)$, $(T_4-T_1)$, $(T_3-T_1)$ and $(T_2-T_1)$ are determinable.

By use of this data, the location of the point A may be determined by an algebraic process as follows:

Let the point O be taken as the origin of a set of three mutually perpendicular coordinate axes, denoted as the $x$, $y$ and $z$ axes. Let the axis $z$, extend vertically through the point O, and the $x$ and $y$ axes be in the plane through O which is perpendicular to the $z$ axis. Let the position of point A with reference to the three axes be denoted by the coordinates $x$, $y$ and $z$. The position of detector $S_1$, is given by the three coordinates $x_1$, $y_1$ and $z_1$; of detector $S_2$ by the coordinates $x_2$, $y_2$, $z_2$, etc. Let V be the velocity of elastic wave in the earth surrounding the well. Let $T_1$, $T_2$, $T_3$, $T_4$, and $T_5$, denote the travel times of a wave originating at point A to the detectors $S_1$, $S_2$, $S_3$, $S_4$, and $S_5$, respectively.

Then $$T_1 = \frac{1}{V}\sqrt{(x-x_1)^2+(y-y_1)^2+(z-z_1)^2} \quad (1)$$

$$T_2 = \frac{1}{V}\sqrt{(x-x_2)^2+(y-y_2)^2+(z-z_2)^2} \quad (2)$$

$$T_3 = \frac{1}{V}\sqrt{(x-x_3)^2+(y-y_3)^2+(z-z_3)^2} \quad (3)$$

$$T_4 = \frac{1}{V}\sqrt{(x-x_4)^2+(y-y_4)^2+(z-z_4)^2} \quad (4)$$

$$T_5 = \frac{1}{V}\sqrt{(x-x_5)^2+(y-y_5)^2+(z-z_5)^2} \quad (5)$$

Whence, $$(T_5-T_1) = \frac{1}{V}\left[\sqrt{(x-x_5)^2+(y-y_5)^2+(z-z_5)^2} - \sqrt{(x-x_1)^2+(y-y_1)^2+(z-z_1)^2}\right] \quad (6)$$

$$(T_4-T_1) = \frac{1}{V}\left[\sqrt{(x-x_4)^2+(y-y_4)^2+(z-z_4)^2} - \sqrt{(x-x_1)^2+(y-y_1)^2+(z-z_1)^2}\right] \quad (7)$$

$$(T_3-T_1) = \frac{1}{V}\left[\sqrt{(x-x_3)^2+(y-y_3)^2+(z-z_3)^2} - \sqrt{(x-x_1)^2+(y-y_1)^2+(z-z_1)^2}\right] \quad (8)$$

$$(T_2-T_1) = \frac{1}{V}\left[\sqrt{(x-x_2)^2+(y-y_2)^2+(z-z_2)^2} - \sqrt{(x-x_1)^2+(y-y_1)^2+(z-z_1)^2}\right] \quad (9)$$

The differential times $(T_5-T_1)$, $(T_4-T_1)$, $(T_3-T_1)$, $(T_2-T_1)$ are determined from the record. The coordinates of each detector may be measured. The unknown quantities in the above equations are therefore four in number, namely, the velocity V, and the three coordinates, $x$, $y$ and $z$ of point A. To solve for these quantities we have the four equations 6, 7, 8 and 9 and the solution will be obtained by ordinary algebraic processes.

In practical work the numerical computation involved in the solution outlined above may sometimes be simplified. In most cases, the deviation of the drill hole from the vertical is sufficiently small so that the co-ordinate $z$ of the point A is equal, to a first approximation, to the depth of the point A as measured along the hole from O to A. This distance may be measured directly by means of a line lowered into the well or may be determined from the length of cable used in drilling. If this approximation is used, the number of unknown quantities to be determined reduces to three and only four detectors need be used to obtain sufficient data to yield a solution of the problem.

To increase the accuracy of the results it is very desirable to use a greater number of detectors than are theoretically necessary to obtain a solution. If additional detectors are used, additional equations of the type of equations 6 to 9 may be set up and the best values for the unknown quantities may be obtained by a least square solution.

In Fig. 3, O represents the mouth of the well and A represents the bottom of the well. Two wave detectors $S_1$ and $S_2$ are placed on the earth's surface at distances $x_1$ and $x_2$ respectively from the point O. Elastic waves produced at the point A by a drilling tool (not shown) travel therefrom to the detectors $S_1$ and $S_2$ along the paths $P_1$ and $P_2$ respectively. The detectors are connected by two-wire cables $C_1$ and $C_2$ through amplifiers $M_1$ and $M_2$ to a recorder R which produces traces on a paper strip of the waves received by the detectors, such recorder being provided with means for placing timing lines above the strip. The depth of the hole is indicated by D.

In Fig. 4, the lines $a_1$ and $a_2$ represent traces produced by the recorder of waves received at the detectors $S_1$ and $S_2$ respectively and the timing lines are indicated by L. $T_1$ and $T_2$ represent the times of arrival at the detectors $S_1$ and $S_2$, respectively, of corresponding portions of a wave produced by the drill tool at the point A. From this record, the time interval $T_2-T_1$ is determinable. The distances $x_1$ and $x_2$ are known and the distance D is determinable from the length of cable used in drilling or from a steel line measurement.

The velocity of the elastic waves may then be calculated as follows:

Let the measured time interval $(T_2-T_1)$ be denoted by $t$. Let $t_1$=travel time of wave from A to $S_1$ and $t_2$=travel time of wave from A to $S_2$. Let V=velocity which is to be found. Let $p_1$= length of path $P_1$ and $p_2$=length of path $P_2$.

Then $$p_1 = \sqrt{X_1^2+d^2}$$

$$p_2 = \sqrt{X_2^2+d^2}$$

$$t_1 = \frac{p_1}{V} = \frac{1}{V}\sqrt{X_1^2+d^2}$$

$$\text{and } t_2 = \frac{p_2}{V} = \frac{1}{V}\sqrt{X_2^2+d^2}$$

So $$t_2-t_1 = \frac{1}{V}\left(\sqrt{X_2^2+d^2}-\sqrt{X_1^2+d^2}\right)$$

or $$V = \frac{1}{t}\left(\sqrt{X_2^2+d^2}-\sqrt{X_1^2+d^2}\right) \quad (1)$$

Equation (1) yields directly the value of the velocity V, if the measured values of the quantities $t$, $X_1$, $X_2$ and $d$ are substituted therein.

For the sake of simplicity, the method has been described as making use of only two detectors. In practice, it is desirable to use more than two detectors, thus obtaining additional equations of the form of Equation (1) from which the best value of the velocity V may be obtained by a least square solution.

In case circumstances make it impractical to obtain a measured value of the depth $d$, the velocity may nevertheless be obtained. In such case at least three detectors must be used to obtain sufficient data to calculate both $d$ and $V$.

While Figure 3 shows the detectors placed in line with each other, it is not necessary that they be so placed. For simplicity in calculations it is desirable that $S_1$ and $S_2$ be placed at the same elevation as the point O, but if this condition cannot be fulfilled an elevation correction may be applied in calculating the lengths of the paths $P_1$ and $P_2$.

In both examples of obtaining data for sub-surface determinations, the drilling process is relied upon to furnish the source of seismic waves and the data is obtained without interruption of the drilling operation and without introducing any additional equipment into the drill hole. The time interval between wave arrival at different points is recorded and by use of such time interval in algebraic processes, the deviation of the bottom of a bore hole is determinable and also the wave velocity in the surrounding earth is also directly calculable.

Although the process has been described in connection with a reciprocating drill as the source of seismic waves, it is to be understood that the source of waves may equally well be a cutting tool rotated by a stem extending to the surface. In this case also, elastic waves are produced by the action of the tool upon the formation in which it is drilling and such waves may be utilized in the practice of this invention.

Furthermore, the vertical position of the drill relative to the mouth of the bore hole may be determined by a trial and error method in place of the mathematical method above referred to or by use of a large number of detectors in different relationships to the mouth of the hole from which can be obtained records by which can be estimated the location of the point directly above the bottom of the hole. With either of these methods, the time intervals between the arrival of the waves at the different detectors would be measured and utilized in determining the location of the point on the earth's surface vertically above the drill.

I claim:

1. The method of making sub-surface determinations which comprises arranging wave detectors on the earth's surface at unequal distances from the mouth of a well bore, operating a drilling tool at the bottom of said bore with consequent production of seismic waves and recording the arrival at said detectors of waves produced at the bottom of the well by said drilling tool.

2. The method of determination of wave velocity in the earth adjacent a well bore which comprises arranging two wave detectors on the earth's surface at unequal distance from the mouth of the well bore, operating a drilling tool at the bottom of said bore with consequent production of seismic waves and determining the interval between the arrival at said detectors of waves produced by said drilling tool.

3. The method of determination of wave velocity in the earth adjacent a well bore which comprises arranging more than two wave detectors at the earth's surface at equal distances from the mouth of the well bore, operating a drilling tool at the bottom of said bore with consequent production of seismic waves and determining the time intervals between the arrival at pairs of detectors of waves produced by said drilling tool.

4. The method of determining the deviation of a well bore which comprises arranging at least three wave detectors on the earth's surface at unequal distances from the mouth of said bore, operating a drilling tool at the bottom of said bore with consequent production of seismic waves and determining the time intervals between wave arrival at the detectors nearest the bore mouth and each of the remaining detectors.

5. The method of determining the deviation of a well bore which comprises arranging more than three wave detectors on the earth's surface at unequal distances from the mouth of said bore, operating a drilling tool at the bottom of said bore with consequent production of seismic waves and determining the time intervals between wave arrival at the detectors nearest the bore mouth and each of the remaining detectors.

6. The method of making sub-surface determinations which comprises operating a drilling tool at the bottom of a well bore of known depth with consequent production of seismic waves, measuring the time interval between the arrival of waves produced by said drilling tool at two points of different known distances from the bore mouth.

7. The method of making sub-surface determinations which comprises operating a drilling tool at the bottom of a well bore with consequent production of seismic waves, measuring the time interval between the arrival of waves produced by said drilling tool at three points of different known distances from the bore mouth.

8. The method of determining the deviation of a bore hole which comprises arranging several detectors on the earth's surface operating a drilling tool in the bore hole with consequent production of seismic waves and recording the arrival at certain detectors of waves produced by said drilling tool.

9. The method of determining the deviation of a bore hole which comprises operating a drilling tool in the bore hole, arranging detectors on the earth's surface and measuring the time intervals between the arrival at said detectors of waves produced by said drilling tool.

BENJAMIN B. WEATHERBY.